US011496867B2

(12) United States Patent
Bellows

(10) Patent No.: US 11,496,867 B2
(45) Date of Patent: Nov. 8, 2022

(54) AUTOMATED VALIDATION OF LOCATION TRACKING SYSTEM

(71) Applicant: ZEBRA TECHNOLOGIES CORPORATION, Lincolnshire, IL (US)

(72) Inventor: David Bellows, Old Westbury, NY (US)

(73) Assignee: Zebra Technologies Corporation, Lincolnshire, IL (US)

(*) Notice: Subject to any disclaimer, the term of this patent is extended or adjusted under 35 U.S.C. 154(b) by 0 days.

(21) Appl. No.: 17/160,620

(22) Filed: Jan. 28, 2021

(65) Prior Publication Data

US 2022/0240051 A1 Jul. 28, 2022

(51) Int. Cl.
| | |
|---|---|
| *H04W 4/029* | (2018.01) |
| *G08B 29/14* | (2006.01) |
| *H04W 4/021* | (2018.01) |
| *H04W 4/35* | (2018.01) |
| *H04W 4/38* | (2018.01) |
| *H04W 4/80* | (2018.01) |
| *H04W 4/02* | (2018.01) |

(52) U.S. Cl.
CPC ............ *H04W 4/029* (2018.02); *G08B 29/14* (2013.01); *H04W 4/021* (2013.01); *H04W 4/023* (2013.01); *H04W 4/35* (2018.02); *H04W 4/38* (2018.02); *H04W 4/80* (2018.02)

(58) Field of Classification Search
CPC .................................................... H04W 4/029
See application file for complete search history.

(56) References Cited

U.S. PATENT DOCUMENTS

| | | | | |
|---|---|---|---|---|
| 2004/0225199 | A1* | 11/2004 | Evanyk | A61B 5/0002 128/903 |
| 2016/0061783 | A1* | 3/2016 | Viren | G01N 29/0654 73/1.82 |
| 2018/0086455 | A1* | 3/2018 | Burch, V | B64D 47/08 |
| 2022/0005332 | A1* | 1/2022 | Metzler | G06V 20/52 |

* cited by examiner

Primary Examiner — Fekadeselassie Girma
Assistant Examiner — Pameshanand Mahase

(57) ABSTRACT

A method of validating a set of location sensors deployed in a facility includes: receiving sensor data from at least a subset of the location sensors; generating a current location of a mobile reference target within the facility based on (i) the sensor data and (ii) expected positions corresponding to the location sensors; based at least on the current location: (i) selecting at least one of the location sensors, and (ii) setting an inspection indicator for the selected location sensor; presenting sensor status data including the inspection indicator via an output device associated with the mobile reference target; and repeating the generating, the selecting, the setting, and the presenting until inspection indicators have been set for each of the location sensors.

18 Claims, 9 Drawing Sheets

AUTOMATED VALIDATION OF LOCATION TRACKING SYSTEM

BACKGROUND

Various facilities, such as retail facilities containing various items for purchase, transport and logistics facilities such as warehouses storing items for shipment, and the like, may deploy inventory tracking systems. Such systems may, for example, track the locations of items to which radio frequency identification (RFID) tags are affixed. To implement location tracking, location sensors such as RFID readers may be installed throughout the facility. Data captured by the RFID readers (e.g. tag responses to scans emitted by the readers) can be employed to determine locations for the RFID-tagged items. Verifying that such a system functions as intended prior to beginning inventory tracking, however, is a time-consuming and costly process.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
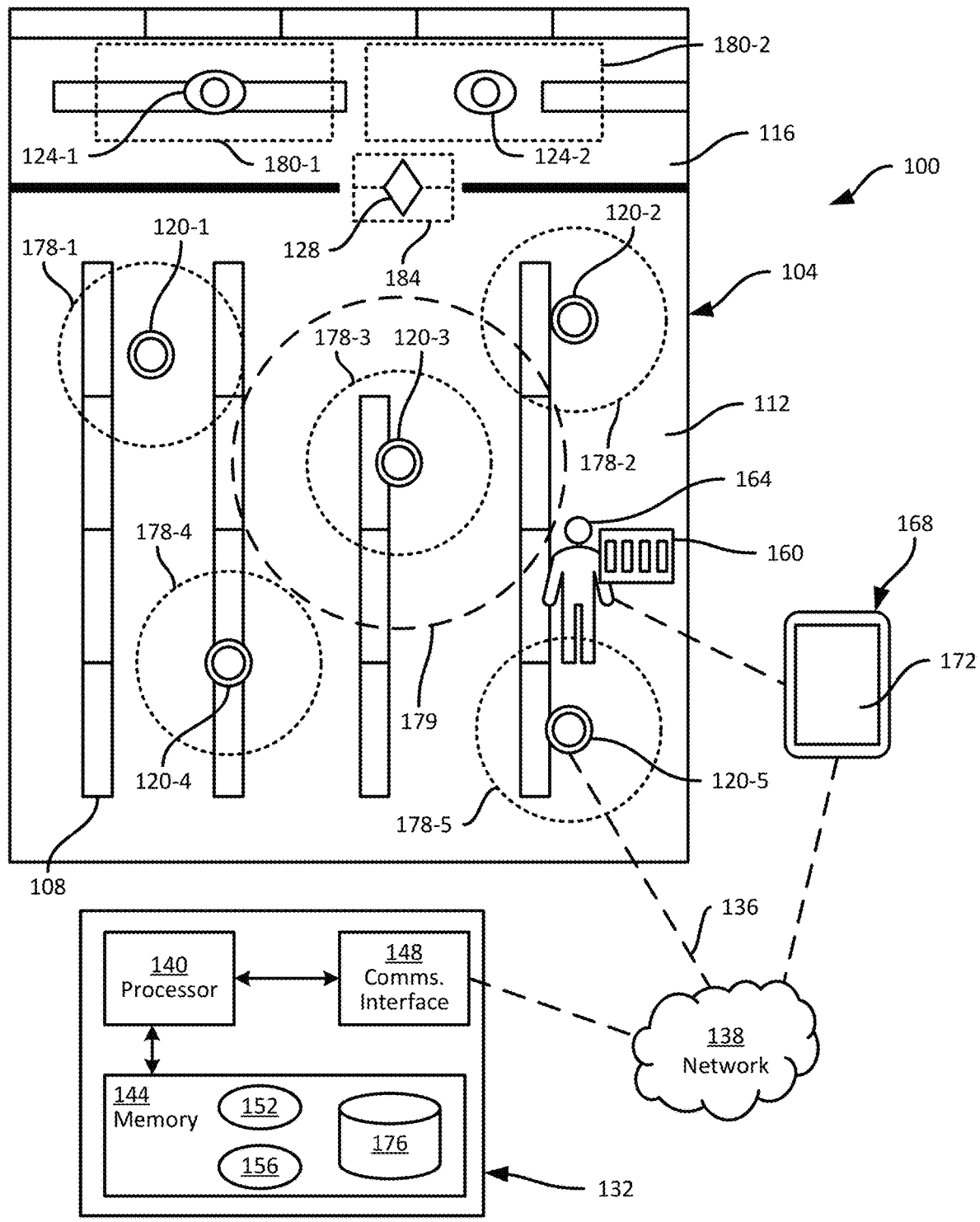
FIG. 1 is a diagram of a location tracking system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Items within a facility, such as a retail facility, warehouse, or the like, can be tracked by installing location sensors such as RFID readers throughout the facility, and affixing or otherwise associating tokens detectable by such sensors (e.g. RFID tags) to the items to be tracked. As will be apparent to those skilled in the art, the location sensors can be operated to periodically scan for tags. The tag responses detected by each sensor, which may contain a tag identifier, such as an electronic product code (EPC), and a signal strength, can be collected and used by a location tracking controller to determine locations of each tag, and therefore of each tagged item.

Determination of locations of the tagged items depends on accurate knowledge of the positions and, for at least some sensors, the orientations of the sensors themselves within the facility, as well as on the absence of other defects or malfunctions in the sensors. Before beginning operation of an inventory tracking system, the system may therefore be validated to verify that the system performs as expected (e.g. that the system correctly detects and locates tags throughout the facility).

The validation process can include data collection during a walk-through by an installation worker following a planned path. For example, the worker may carry one or more RFID tags, and the location of those tags as detected by the system during the walk-though can be collected, for subsequent review by an expert. That is, the expert may compare the planned path defining the walk-through with the collected location data to determine subjectively whether the performance of the system is adequate.

The above validation process introduces a delay between the collection of data on-site, and the detection of problems with the deployment, by which time installation staff are generally no longer present on-site. The reliance of this process on expert reviewers also presents an obstacle to scaling up the number of contemporaneous deployments. In addition, deviations from the planned path during the walk-through, which may be difficult to avoid in large and/or complex facilities, complicate the subsequent review by the expert. For example, uncertainty is created for the expert when trying to discern whether the worker mistakenly did not follow the planned path or the system is poorly deployed and/or not performing properly. This may result in the need to repeat the walk-through, further delaying system start-up and increasing deployment cost.

Furthermore, generating the planned path that is followed during a validation walk-through is not a trivial task. Since a proper path passes by each of the many installed location sensors, creating this path can be a time-consuming and therefore expensive activity, especially for deployments with a significant number of sensors. Moreover, there is opportunity for the path to be created incorrectly, which could result in improper system validations. For example, the path may be incomplete with sensors missed. It is also difficult to generate realistic paths overlaid on site maps when there is low confidence that such site maps are up-to-date and accurate. For example, apparel stores typically do not have structured aisles and often have clothing racks on wheels, which are frequently reconfigured in the store's flexible, open layout without updating the site map. These racks' locations therefore often don't reflect reality on the site map and instead cause confusion when creating and then attempting to follow a planned path. The proposed path may appear to be walkable when overlaid on the site map, but in reality, it intersects and interferes with these clothing racks and other obstacles that are not properly reflected on the site map.

Described herein are systems and methods for at least a partially automated validation of location tracking systems, to reduce or eliminate reliance of the validation process on expert review after data collection, and to reduce or eliminate the need for the walk-through to follow a planned path.

Examples disclosed herein are directed to a method of validating a set of location sensors deployed in a facility, the method comprising: receiving sensor data from at least a subset of the location sensors; generating a current location of a mobile reference target within the facility based on (i) the sensor data and (ii) expected positions corresponding to the location sensors; based at least on the current location: (i) selecting at least one of the location sensors, and (ii) setting an inspection indicator for the selected location sensor; presenting sensor status data including the inspection indicator via an output device associated with the mobile reference target; and repeating the generating, the selecting, the setting, and the presenting until inspection indicators have been set for each of the location sensors.

Additional examples disclosed herein are directed to a computing device, comprising: a communications interface connected to a set of location sensors deployed in a facility; and a processor configured to: receive sensor data from at least a subset of the location sensors; generate a current location of a mobile reference target within the facility based on (i) the sensor data and (ii) expected positions corresponding to the location sensors; based at least on the current location: (i) select at least one of the location sensors, and (ii) set an inspection indicator for the selected location sensor; present sensor status data including the inspection indicator via an output device associated with the mobile reference target; and repeat the generation, the selection, the setting, and the presentation until inspection indicators have been set for each of the location sensors.

FIG. 1 illustrates a location tracking system 100, which in this example is deployed in a retail facility 104 (depicted from overhead) containing items disposed on racks, aisles of shelving, or the like. For example, the facility 104 as shown in FIG. 1 includes a plurality of aisles 108 in a customer area 112, e.g. of shelving, peg boards, clothes hangers, or the like. The aisles 108 support a variety of items for purchase by customers of the facility 104. The facility 104 also includes, in this example, a storage room 116, e.g. for additional inventory used to replenish the aisles 108. At least some items in the facility 104 are associated with location tags, such as RFID tags. The system 100, in general, is configured to periodically detect and locate each of the above-mentioned RFID tags, thus locating the items associated therewith.

Detection and location of RFID tags is performed by a set of location sensors of the system 100. The location sensors can be mounted on ceilings, walls, or the like, of the facility 104, and various types of location sensors can be deployed to provide sufficient coverage of the facility 104. The location sensors in the examples discussed herein are RFID readers. This can include any combination of RFID antenna types and/or arrangements as part of each RFID reader. Each location sensor may include one RFID antenna or multiple RFID antennas. Furthermore, each location sensor may include an RFID radio and antenna(s) integrated in the same enclosure, or the antenna(s) may be tethered via RF cable(s) remotely. In one embodiment, a location sensor may include multiple antennas arranged in a circle to radiate outwardly from the circle. For example, the location sensor may include eight antennas evenly disposed at 45° intervals of the circle, with each antenna having a beam pattern extending in a different direction, and collectively creating a 360° coverage area for the location sensor. In another example, the location sensor may include a phased-array antenna that is steerable (electronically and/or mechanically) to produce a beam pattern that extends in one or more pre-defined directions. It will also be understood that in other examples, other forms of location sensing technology may be employed instead of RFID.

In the illustrated example, the customer area 112 of the facility 104 includes a plurality of locations sensors 120-1, 120-2, 120-3, 120-4, and 120-5 (collectively referred to as the location sensors 120). The location sensors 120 can be ceiling-mounted location sensors with substantially circular coverage areas. The number and placement of location sensors 120 varies from facility to facility, to provide sufficient coverage of the customer area 112. For example, the coverage of the sensors 120 may overlap such that any point in the customer area 112 is within the coverage area (i.e. the area within which the corresponding sensor 120 can detect tags) of at least two sensors 120.

The system 100 also includes, in the illustrated example, additional location sensors 124-1 and 124-2 in the storage room 116. The sensors 124 may have substantially rectangular coverage areas. Further, the system 100 can include a transitional location sensor 128 disposed at a doorway between the customer area 112 and the storage room 116. The transition sensor may have two distinct coverage areas, one on each side of the doorway, so as to detect when a tag transitions between the storage room 116 and the customer area 112 in either direction. While the illustrated example shows only one transition sensor 128, it should be noted that the system 100 may include additional transition sensors disposed at other transition locations, such as other doorways between the customer area 112 and the storage room 116, building entrances/exits, and the like. The number and placement of location sensors 124 and 128 varies from facility to facility, to provide sufficient coverage of the storage room(s) 116 and transition(s) in the facility 104 respectively.

The system 100 may also include location sensors at transaction locations in the facility 104. While these location sensors are not illustrated in the example in FIG. 1, they can be mounted to or from the ceiling, to the furniture such as under a counter or adjacent to a bagging area, to the facility's existing infrastructure such as from a pole, or the like. These location sensors may include only one antenna and have substantially circular coverage areas focused on the transaction areas where items associated with location tags, such as RFID tags, are purchased, returned, prepared for delivery and/or pickup, or the like. These focused coverage areas are smaller than the coverage areas of location sensors 120. Other areas this type of focused location sensor may be used include fitting rooms and special merchandise storage areas. The number and placement of these location sensors varies from facility to facility, to provide sufficient coverage of the appropriate areas. When installed in such a way that the sensing direction is pointed into the page relative to FIG. 1 (i.e. mounted from the ceiling directed towards the floor) or out of the page relative to FIG. 1 (i.e. mounted under the counter directed towards the ceiling), this type of location sensor may not have a further expected installation orientation (i.e. no requirement for a specific orientation about an axis orthogonal to the layout depicted from overhead in FIG. 1).

Any number and combination of types of location sensors may be deployed in the facility for item location tracking, depending on the layout and features of the facility as well as the location tracking use case(s).

The system 100 also includes a computing device 132, such as a server, connected to the location sensors 120, 124, and 128 via links 136 (one link 136 is illustrated in FIG. 1 for simplicity) to a local network 138, for example including a wired or wireless access point.

The computing device 132 includes a controller, such as a processor 140, interconnected with a non-transitory computer readable storage medium, such as a memory 144. The memory 144 includes a combination of volatile memory (e.g. Random Access Memory or RAM) and non-volatile memory (e.g. read only memory or ROM, Electrically Erasable Programmable Read Only Memory or EEPROM, flash memory). The processor 140 and the memory 144 each comprise one or more integrated circuits. The computing device 132 also includes a communications interface 148 enabling the server 132 to exchange data with other devices, including the location sensors 120, 124, and 128, e.g. via the network 138.

The memory 144 stores computer readable instructions for execution by the processor 140. In particular, the memory 144 stores a locating application 152 which, when executed by the processor 140, configures the processor 140 to process sensor data received from the location sensors of the system 100 and determine locations of tags within the facility 104. For example, each location sensor can provide to the computing device 132, for each tag detected by that location sensor, an identifier of the tag, such as an EPC, and a signal strength associated with a response from the tag. Based on previously stored location sensor positions within the facility, the sensor data, and, for at least some sensors, previously stored orientations of the location sensors within the facility, the computing device 132 can determine tag locations. For location sensors comprised of multiple antennas each with a different coverage area (e.g. they are pointing in different directions, have different gains and/or radiation patterns, are transmitting at different power levels, and/or the like), the sensor data may also include which of these antenna(s) detected the tag. For example, the location sensor may include eight antennas arranged in a circle and pointed outwards, evenly disposed at 45° intervals. In this example, the sensor data may include for each tag detected the antenna number label(s) (i.e. #1 through #8) of the antenna(s) that detected each tag. With the orientation, and corresponding coverage area, of each of the eight antennas within the location sensor known, this information can be used to help determine the locations of detected tags relative to the sensor. The tag locations may be stored in the memory 144, reported to other computing devices, or the like.

The memory 144 also stores a validation application 156. Execution of the validation application 156 configures the processor 140 to implement a process to determine whether the system 100 is performing as expected, e.g. when the system 100 is newly deployed or following changes to the system 100. As will be apparent, deploying the system 100 includes installing the location sensors 120, 124, and 128 within the facility 104, and connecting the location sensors 120, 124, 128 to the computing device 132 via a switch or other communications equipment. Expected positions and orientations for the location sensors within the facility 104 are selected prior to deployment, to provide sufficient coverage of the facility 104. During installation, certain location sensors may be installed at positions that deviate from their expected positions, for example due to installer error or interfering structural elements within the facility.

Further, some location sensors, such as the sensors 120, 124, and 128, have orientations and may therefore be installed at the correct position but with an orientation that does not match the expected orientation. For example, the sensor 128 may inadvertently be mounted backwards, such that the two coverage areas mentioned above are on opposite sides of the doorway than expected. In another example, one of the sensors 124 may inadvertently be mounted backwards, resulting in the measured locations of tags to be to the left of the sensor (as shown in the layout depicted from overhead in FIG. 1) when they are actually to the right of the sensor, and vice versa. In yet another example, one of the sensors 120 may inadvertently be mounted in an orientation rotated 90° clockwise from the expected orientation about an axis orthogonal to the layout depicted from overhead in FIG. 1. As a result, the measured locations of tags in the vicinity of this sensor will be inaccurate since the data from this sensor that contributes to the location determination made by the processor 140 is offset by 90°. For example, if this location sensor includes eight antennas arranged in a circle and pointed outwards, evenly disposed at 45° intervals, the sensor data may report that a tag is detected by antenna #3 which is expected to point up on the layout, but based on the tag's actual location, the system 100 should have expected this tag to be detected by antenna #5, which is expected to point to the right on the layout. Furthermore, there may be location sensors installed in both the incorrect position and incorrect orientation (i.e. neither match what is expected). In addition, some location sensors may be damaged or otherwise defective, and may therefore not operate correctly despite having been installed correctly.

The validation process implemented by the computing device 132 enables the collection of sensor data by movement of a mobile reference target 160 through the facility. The target 160 can be a board bearing a set of RFID tags (four are shown in FIG. 1, but fewer or more tags can be used in other examples). The reference target 160 is transported throughout the facility 104, e.g. by a vehicle, a robot, or a worker 164, without adhering to any particular travel path. The computing device 132 is configured via the application 152 to process the collected sensor data to periodically determine a current position of the reference target 160, thus enabling the validation application 156 to monitor the travel path of the reference target 160 over time. The computing device 132 is further configured to determine, based on that path and on certain attributes of the location sensors stored in the memory 144, whether each of the location sensors is functioning as expected.

Further, the computing device 132 is configured to provide feedback, autonomously and substantially in real-time, to the worker 164 during the validation process. For example, the worker 164 can carry or otherwise access a client computing device 168 such as a smartphone, tablet computer, or the like. The feedback data can be presented via an output assembly of the client device 168, such as a display 172. The feedback data indicates which of the location sensors have been inspected and which sensors remain to be inspected. The feedback data may also indicate, for sensors that have been inspected, whether those sensors passed or failed validation.

The computing device 132 stores, e.g. in the memory 144, a repository 176 containing sensor attributes for use during the validation process mentioned above. In this example, the repository 176 stores the expected position of each location sensor according to a frame of reference previously established in the facility 104. For location sensors with orientations, such as the sensors 120, 124, and 128, the repository 176 can also contain expected orientations according to frames of reference previously established in both the facility 104, which could be notated with a compass rose on the associated layout, and the location sensors. For example, an orientation of 0° could be defined as the alignment of a specified feature of the location sensors with the "up"

direction on the layout depicted from overhead in FIG. 1 (i.e., this feature points to the top of the layout). An orientation of 180° would conversely be when this specified feature points in the "down" direction, or to the bottom of the layout depicted from overhead in FIG. 1."

The repository 176 also contains inspection zone definitions for the location sensors 120, 124, and 128. As will be apparent to those skilled in the art, each location sensor has an effective range that defines an area of coverage within which the sensor can detect RFID tags. The inspection zones defined in the repository 176 for each sensor are generally smaller than the effective coverage areas of the sensors. For example, the repository 176 defines respective inspection zones 178-1, 178-2, 178-3, 178-4, and 178-5 for the location sensors 120. Each inspection zone 178 has a defined radius extending about the expected location of the sensor 120 itself. The inspection zones 178 are smaller than the effective coverage areas of the sensors 120. For example, a coverage area 179 of the sensor 120-3 is shown in FIG. 1. The inspection zones 178 can be defined as a radius extending from the expected positions of the corresponding sensor 120.

The repository 176 also defines inspection zones 180-1 and 180-2 corresponding to the location sensors 124-1 and 124-2. The inspection zones 180, for example, can be defined by widths and lengths of rectangular areas centered on the expected positions of the sensors 124. It should be noted that inspection zones are not limited to circular and rectangular shapes but can instead be defined in the repository 176 as any appropriate shape that is generally smaller than the effective coverage of the sensor. The inspection zones also do not need to be centered on the respective expected positions of the sensors. The relationship of the inspection zone's location to the expected position of the sensor generally depends on the shape of the effective coverage of the sensor (e.g. directional versus omnidirectional) and/or the physical orientation of the sensor relative to the facility 104, which may include how and/or where the sensor is mounted. For example, a sensor may include a directional antenna that is mounted from a ceiling and pointed towards the floor. This sensor may have a resulting coverage area generally resembling a circle on the facility's layout that is centered on the sensor's position and a circular inspection zone as depicted on the facility's layout also centered on the sensor's position but with a smaller radius than the coverage area's radius.

In another example, a sensor may include the same type of directional antenna but instead mounted on a wall and pointed laterally into the room. The coverage area in this example may reflect a rectangle on the facility's layout extending from the sensor in the direction the antenna is pointing. In this example, the center of the rectangular coverage area is not aligned with the sensor's position. Instead, one edge of the coverage area is aligned with the sensor's position. The corresponding inspection zone will generally be a smaller rectangle also extending from the sensor (i.e. with one edge aligned with the sensor's position). Furthermore, the definition of each sensor's inspection zone may also be influenced by the environment local to the sensor. For example, the sensor may be adjacent to a reflective or absorptive surface, which may affect the sensor's performance characteristics and may therefore justify a limitation or expansion to the corresponding inspection zone accordingly.

The repository 176 also defines an inspection zone 184 corresponding to the location sensor 128. The inspection zone 184, for example, can be defined by a width and a length of a rectangular area centered on the expected position of the sensor 128. The zone 184 may be defined as two sub-zones, on opposite sides of the expected position of the sensor 128 and corresponding to the distinct coverage areas of the sensor 128. In the example of sensor 128, the distinct coverage areas may be on opposite sides of the doorway. It should be noted that the number of inspection sub-zones for a sensor is not limited to two; additional inspection sub-zones may be defined to coincide with additional distinct coverage areas of the sensor.

As will be discussed below in greater detail, the computing device 132 is configured to use the inspection zone definitions and collected sensor data to conduct the validation process.

Those skilled in the art will appreciate that the functionality implemented by the processor 140 via the execution of the application 156 may also be implemented by one or more specially designed hardware and firmware components, such as FPGAs, ASICs and the like in other embodiments.

Figure 2:
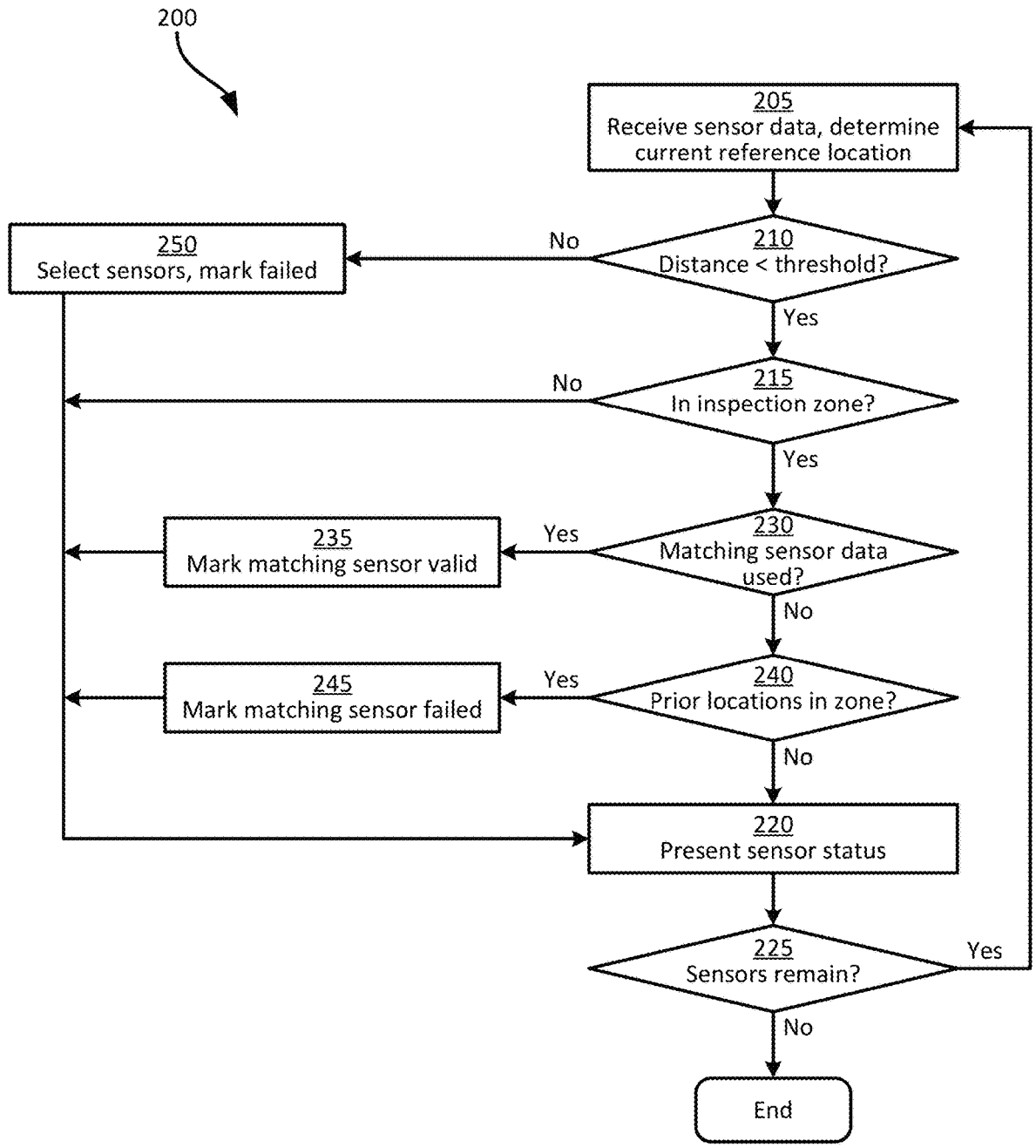
FIG. 2 is a flowchart of a method for validating a location tracking system.

The performance of the above-mentioned validation process will now be discussed with reference to FIG. 2. FIG. 2 illustrates a method 200 of validating a location tracking system, which will be described below in conjunction with its performance to validate the system 100 as shown in FIG. 1. In this example, the blocks of the method 200 are performed by the computing device 132, in conjunction with the client device 168 at certain stages.

At block 205, the computing device 132 is configured to receive sensor data from the location sensors 120, 124, and 128, and to determine a current location of the reference target 160 based on the sensor data and the attributes in the repository 176, such as the expected positions and orientations of the location sensors. Prior to beginning the performance of the method 200, the computing device 132 may, for example, receive an indication from the client device 168 that the worker 164 is ready to begin travelling through the facility 104 carrying the reference target 160. Alternatively, the computing device 132 can transmit a command to the client device 168 for presentation on the display 172, instructing the worker 164 to begin traversing the facility 104 with the reference target 160.

As will be apparent to those skilled in the art, the sensor data received at block 205 includes, from each location sensor, identifiers such as EPCs of any tags detected by that sensor, a signal strength measurement for each detected tag, and if the location sensor is comprised of more than one antenna, the antenna number label(s) identifying which respective antenna(s) detected each tag. Based on the expected position and orientation of the location sensor as stored in the repository 176, the signal strength measurements for the same tag identifier from multiple location sensors, and which specific location sensor antenna(s) detected the tag, the computing device 132 determines a current location for the tag. Thus, for the reference target 160, the computing device 132 determines a current location for each of the tags thereon. The computing device 132 can determine the current location for the reference target 160 itself by averaging the locations of each individual tag on the reference target 160. As such, it is not necessary for every tag on the reference target 160 to be detected at every instance of block 205.

Figure 3:
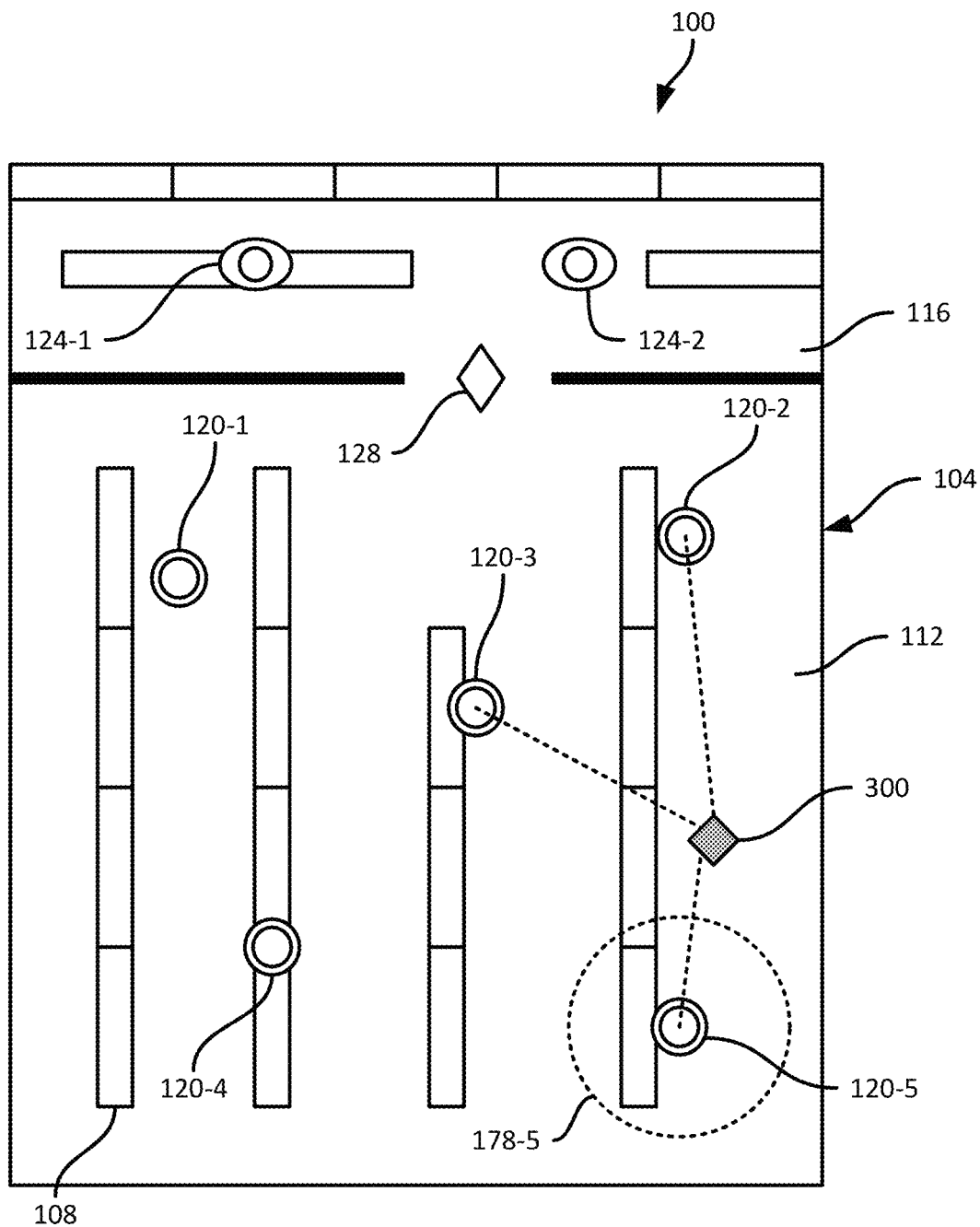
FIG. 3 is a diagram illustrating an example performance of block 205 of the method of FIG. 2.

FIG. 3 illustrates an example performance of block 205, indicating that the location sensors 120-2, 120-3, and 120-5 have detected some or all of the tags on the reference target. Based on the expected positions and orientations of the location sensors 120-2, 120-3, and 120-5 and on sensor data from those sensors, the computing device 132 determines a current location 300 of the reference target 160.

Having determined a current location of the reference target 160, the computing device 132 is configured to determine whether any of the location sensors can be inspected. Inspecting a location sensor includes determining whether the location sensor is, or is not, performing as expected. A location sensor that is found to perform as expected is assigned (e.g. in the repository 176) a validated inspection indicator, while a location sensor that is found not to perform as expected is assigned a failed inspection indicator.

All location sensors in the system 100 are initially marked as not inspected in the repository 176. The method 200 ends, as will be seen below, when all the location sensors have been inspected, meaning that each location sensor has been assigned either of the inspection indicators mentioned above.

Following block 205, in other words, the computing device 132 is configured to select one or more location sensors for inspection, and to set an inspection indicator for the selected sensor(s). In some cases, for a given current location of the reference target 160, no location sensors are selected for inspection.

The selection of location sensors for inspection and the setting of inspection indicators for selected sensors includes initially, validation of the current location of the reference target 160 determined at block 205. Specifically, at block 210, the computing device 132 is configured to determine whether a distance between the current location of the reference target 160 and a preceding location of the reference target 160 (e.g. from the previous performance of block 205) is below a validation threshold. The threshold corresponds to an expected movement distance, which is based on an expected movement speed of the reference target 160 (and therefore the worker 164). For example, if the worker 164 travels on foot through the facility, and sensor data is collected at block 205 every two seconds, the threshold can be set at about 2.5 meters. The validation threshold may be generated dynamically based on motion data, e.g. collected by the client device 168. For example, the client device 168 may include an accelerometer and/or other motion sensor hardware, to implement pedometer functionality and generate an estimated velocity of the worker 164. The validation threshold can be scaled upwards or downwards from a default value based on a deviation of the estimated velocity relative to a default expected velocity.

In further examples, the client device 168 can generate audible and/or haptic output to implement a metronome function, e.g. by producing a click or beep at a cadence to be matched by the worker 164. The client device 168 may therefore assist the worker 164 in maintaining an expected travel velocity that aligns with the selected validation threshold.

More generally, a distance between consecutive measured locations of the reference target 160 that exceeds the threshold indicates a likely error in location measurement, because the worker 164 is unlikely to have travelled fast enough to cover such a distance between two location samples. As will be discussed further below, certain location sensors may be assigned the failed inspection indicator when the determination at block 210 is negative.

In the present example, the location 300 is the first measured location, and therefore the distance between the current and preceding locations is zero. The determination at block 210 is therefore affirmative, and the performance of the method 200 proceeds to block 215.

At block 215, having established that the current location 300 is valid (i.e. is not indicative of a performance error in the system 100) the computing device 132 is configured to determine whether the current location 300 is within any of the above-mentioned inspection zones. When the current location is within an inspection zone, the corresponding location sensor can be assessed to determine which inspection indicator to assign it. When the current location is outside a sensor's inspection zone, however, no decision is made on the inspection of that sensor, because the reference target 160 may be sufficiently distant from the sensor that the presence or absence of a detection of the reference target 160 by the sensor may be indicative of interference or other environmental factors rather than of the performance of the sensor. In one example, if the current location is within the coverage area 179 of location sensor 120-3 but outside of this location sensor's inspection zone 178-3, no decision is made on the inspection of that sensor.

As is apparent from FIG. 3, the current location 300 is not within any of the inspection zones. The closest location sensor to the current location 300 is the sensor 120-5, but the current location remains outside the inspection zone 178-5. Returning to FIG. 2, the determination at block 215 is therefore negative. Following a negative determination at block 215, the computing device 132 proceeds to block 220, and presents sensor status data including any assigned inspection indicators. Presentation of the status data can include, for example, transmitting the status data to the client device 168 for rendering on the display 172. The status data can include a list of the location sensors 120, 124, and 128, along with an indication of whether each sensor has been assigned an inspection indicator. That is, the status data indicates to the worker 164 which sensors remain to be inspected. The status data can include a map showing the expected positions of the sensors as well as the current location of the reference target 160 (and optionally, any previous locations), to guide the worker 164 in deciding where to travel next. This can be done, for example, by highlighting the icon on the display 172 that corresponds to the location sensor to travel to next. The validation application 156 may select this location sensor based on calculating the distances from the current reference target 160 location to the surrounding location sensors, taking into account which location sensors have already been assigned an inspection indicator. This task direction can reduce or eliminate the need for the worker 164 to identify which location sensors are remaining to inspect.

Following block 220, the computing device 132 determines whether any location sensors remain to be inspected. When the determination at block 225 is affirmative, as in this case (since no sensors have yet been inspected), the computing device 132 returns to block 205 to obtain further sensor data and update the current location of the reference target 160.

Figure 4:
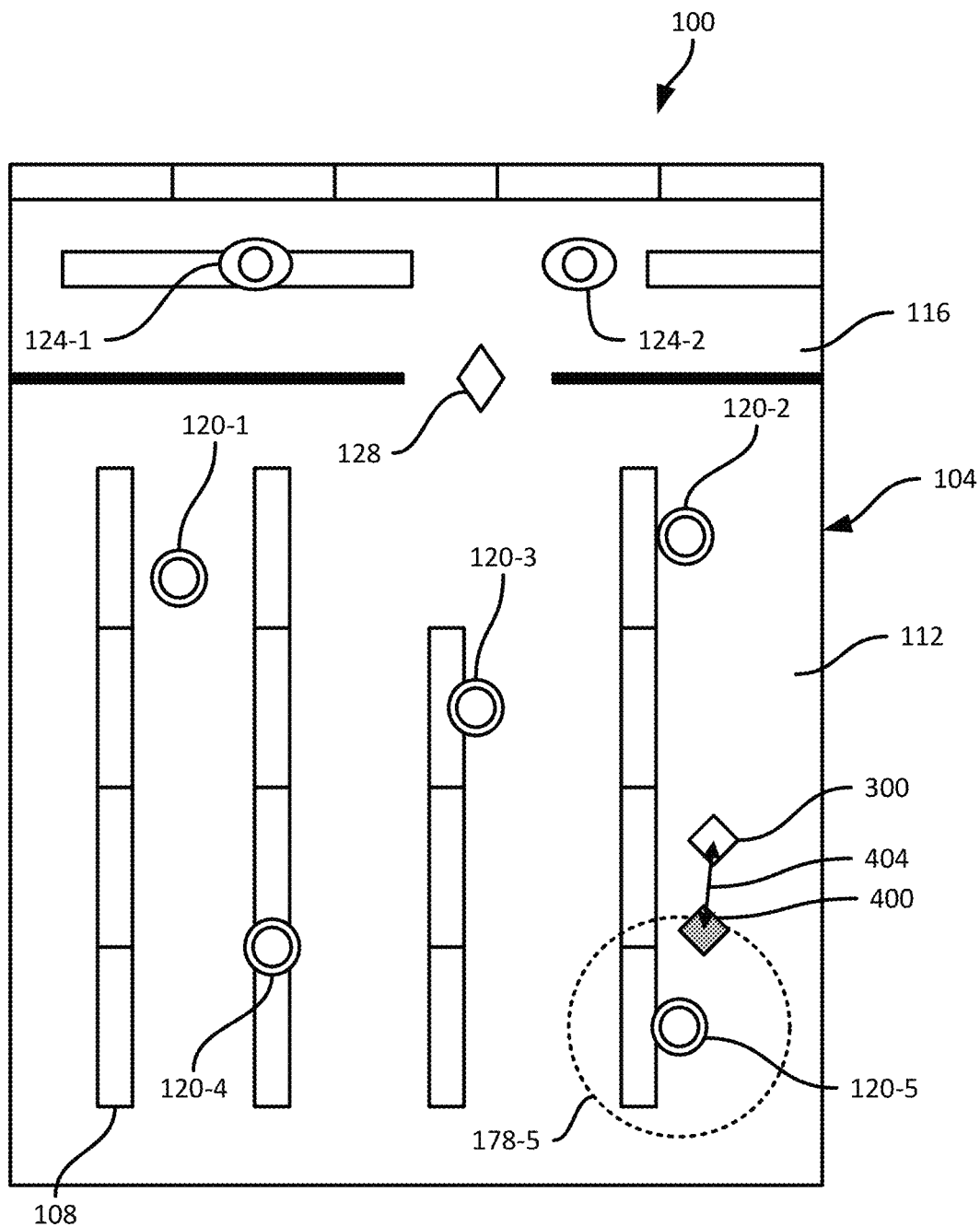
FIG. 4 is a diagram illustrating an example performance of blocks 210 and 215 of the method of FIG. 2.

FIG. 4 illustrates a further performance of block 205, in which a current location 400 is determined for the reference target 160. The preceding location 300 of the reference target 160 is also shown for reference. At block 210, the computing device 132 determines that the distance 404 between the locations 300 and 400 is below the threshold, and the current location 400 is therefore considered valid (i.e. not indicative of a performance issue in the system 100). At block 215, the determination is affirmative, because the current location 400 is within the inspection zone 178-5. The current location 400, in other words, is considered close enough to the sensor 120-5 to assign an inspection indicator to the sensor 120-5.

At block 230, following an affirmative determination at block 215, the computing device 132 determines whether sensor data from the location sensor 120-5 was used to generate the current location 400. As noted earlier, multiple sensors may detect the same tag at each performance of block 205, and such detections can be combined to generate the current location of the tag. The computing device 132 therefore determines at block 230 whether the location sensor 120-5 (that is, the sensor within whose inspection zone the current location 400 falls) contributed to the current location 400. It is assumed in this example that the determination at block 230 is affirmative. That is, the location sensor 120-5 is assumed to have successfully detected at least some of the tags of the reference target 160 and therefore contributed to the current location 400. Therefore, the computing device 132 proceeds to block 235. Alternatively, for location sensors with inspection sub-zones, such as location sensor 128 with inspection zone 184 that is split into two inspection sub-zones, the determination at blocks 215 and 230 may need to have been affirmative for all sub-zones prior to proceeding to block 235. While this alternative embodiment is not shown in FIG. 2, when block 230 is determined to be affirmative for a location sensor's sub-zone but there are other inspection sub-zones not inspected yet (i.e. not yet determined to be affirmative at blocks 215 and 230) for that location sensor, rather than proceeding to block 235, the process may instead skip to block 220.

Figure 5:
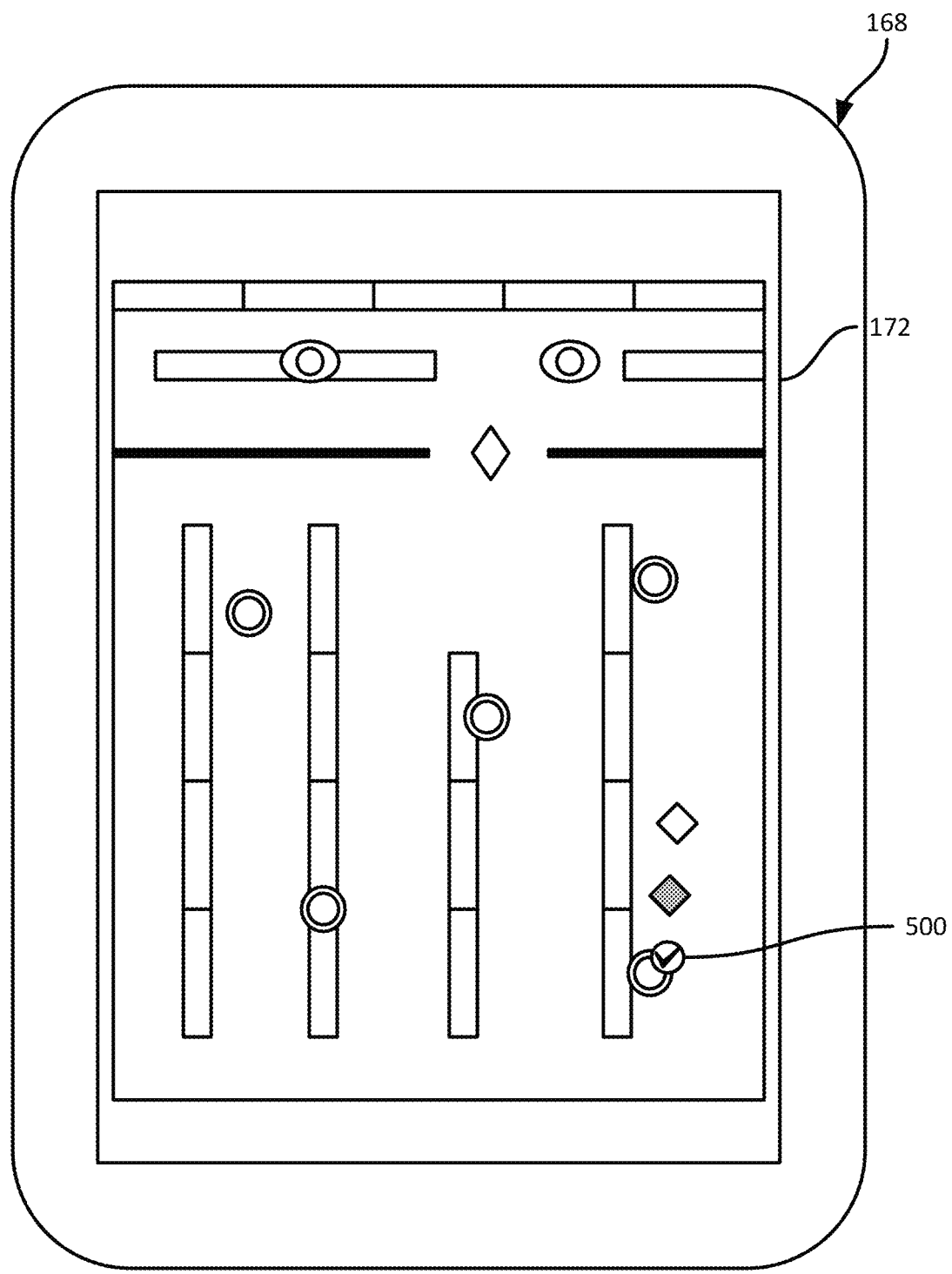
FIG. 5 is a diagram illustrating an example performance of block 220 of the method of FIG. 2.

At block 235, the computing device 132 assigns a validated inspection indicator to the location sensor 120-5. For example, the repository 176 can be updated to include the validated inspection indicator in association with an identifier of the location sensor 120-5. At block 220, updated status data may be presented, e.g. via the client device 168. For example, as shown in FIG. 5, the status data provided to the client device 168 and rendered on the display 172 can include a visual indicator 500 indicating that the location sensor 120-5 has been validated (i.e. assigned a validated inspection indicator). The visual indicator 500 in this example includes a checkmark displayed in association with the expected position of the location sensor 120-5. In other examples, the visual indicator can include a color (e.g. green) assigned to the expected position of the location sensor 120-5, or the like.

Figure 6:
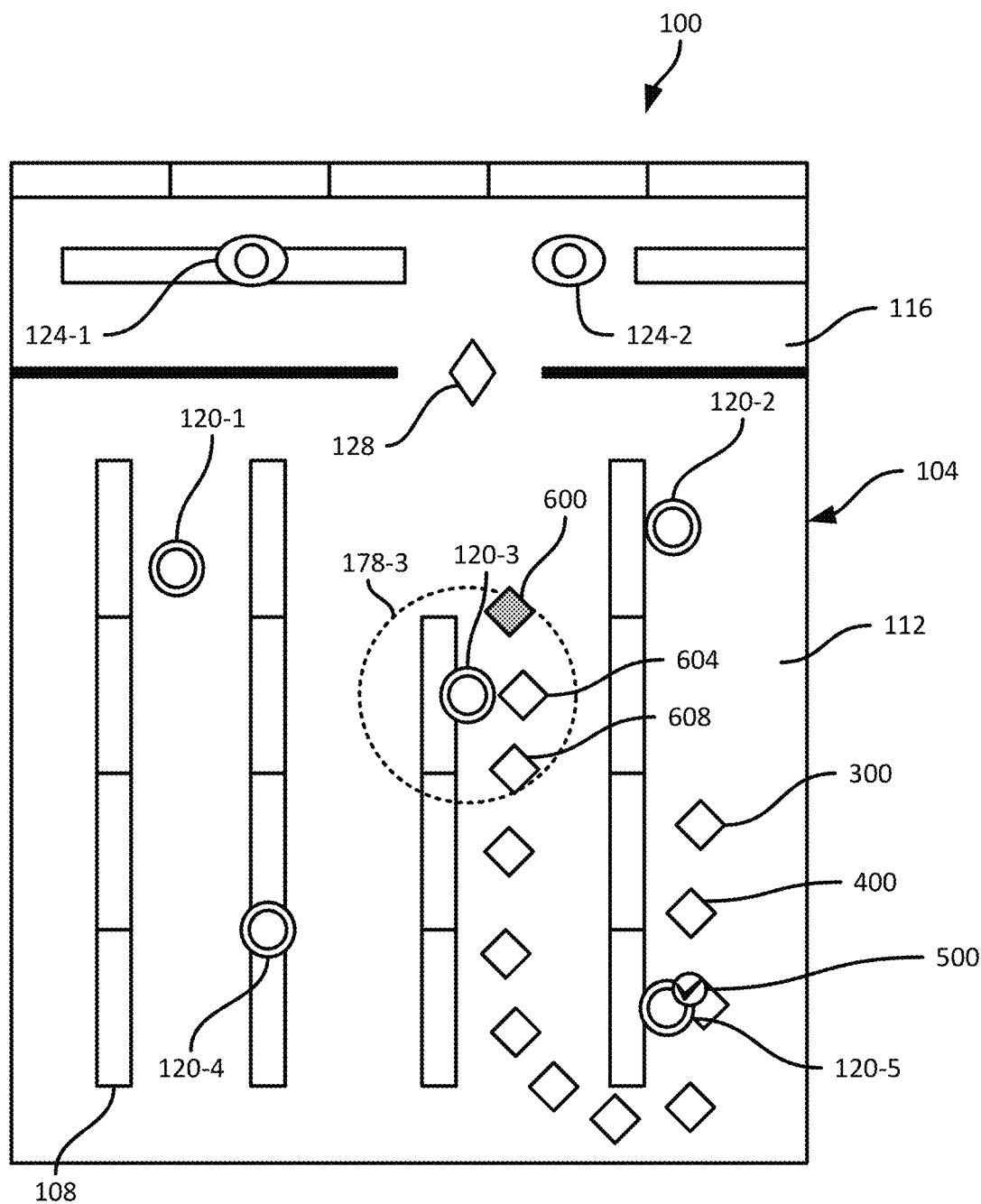
FIG. 6 is a diagram illustrating an example performance of blocks 230 and 240 of the method of FIG. 2.

Returning to FIG. 2, the determination at block 225 is affirmative because further sensors remain to be inspected. The computing device 132 is therefore configured to return to block 205. FIG. 6 illustrates several further performances of block 205, followed by a positive determination at block 210 and a negative determination at block 215. As will be apparent, although some of the locations accumulated in FIG. 6 would fall within the inspection zone 178-5 of the sensor 120-5, the sensor 120-5 has already been validated, and is therefore no longer considered.

The current location of the reference target 160 shown in FIG. 6 is a location 600, which falls within the inspection zone 178-3 of the location sensor 120-3. Assuming the determination at block 210 is affirmative, the determination at block 215 is also affirmative, and the computing device proceeds to block 230. At block 230, as noted above, the computing device 132 determines whether sensor data from the location sensor 120-3 was used to generate the current location 600. In the present example, the determination at block 230 is assumed to be negative. In other words, the location sensor 120-3 failed to detect any of the tags on the reference target 160, or generated sensor data for such tags that was discarded during generation of the current location 600.

Because the current location 600 is within the inspection zone 178-3, the location sensor 120-3 is expected to contribute to the current location 600 if functioning correctly. Therefore, the computing device 132 proceeds to block 240 and determines whether a predetermined number of preceding locations of the reference target 160 were also within the inspection zone 178-3. If the determination at block 240 is negative, no decision is made yet on the status of the location sensor 120-3. Instead, such a decision is withheld until further information is available. There is a possibility that location sensor 120-3 was just not able to detect any tags on the reference target 160 in the inventory round (e.g. detection round) that was used to determine the locations of the tags on reference target 160, for example if the coverage area 179 was crowded with a large population of other tags. Rather than assigning an inspection indicator for location sensor 120-3 potentially prematurely, the computing device 132 waits in order to make a more confident decision.

In the present example, however, the current location 600 is the third recent location measured within the inspection zone 178-3. Two preceding locations 604 and 608 are also within the inspection zone 178-3. The predetermined number mentioned above is also assumed to be two in this example, so the determination at block 240 is therefore affirmative. The fact that three consecutive locations 608, 604, and 600 for the reference target 160 fall within the inspection zone 178-3, coupled with the fact that the sensor 120-3 has not contributed to the generation of any of the locations 608, 604, and 600, indicate a malfunction of the location sensor 120-3 or that the location sensor 120-3 was installed in a different position compared to what was expected and stored in the repository 176. Such a discrepancy between the installation position and the expected position could be a result of the location sensor being physically installed in the wrong location. Alternatively, or in combination therewith, the expected location could have been incorrectly defined in the repository 176, making it appear that locations 608, 604, and 600 were within inspection zone 178-3 when they physically were not. For all of these possible scenarios, the validation method 200 is capable of detecting the error. This example highlights the importance of block 230: if the validation process relied on block 215 (i.e. determining whether the reference target 160 entered inspection zone 178-3) without considering block 230 in order to validate location sensor 120-3, then location sensor 120-3 would have been improperly validated. However, since location sensor 120-3 did not contribute to the determination of any of the locations 608, 604, and 600 believed to be located within inspection zone 178-3, block 230 ensures that the location sensor 120-3 did not get inappropriately validated.

Figure 7:
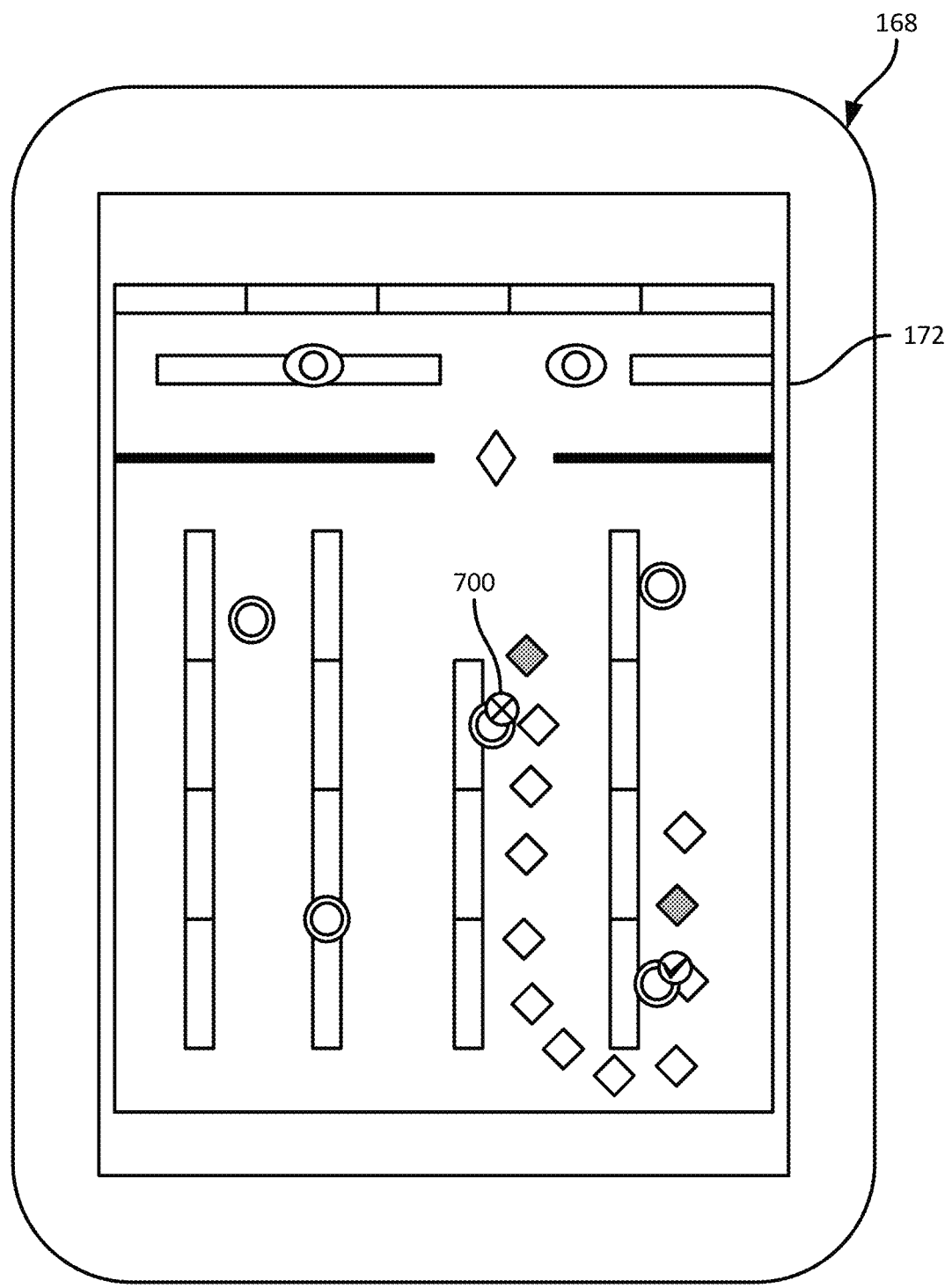
FIG. 7 is a diagram illustrating a further example performance of block 220 of the method of FIG. 2.

At block 245, the location sensor 120-3 is therefore marked as failed. In a further performance of block 220, status data presented via the client device 168 is updated, e.g. as shown in FIG. 7. For example, the location sensor 120-3 can be shown with a failed inspection indicator 700, such as an X, a red color applied to the expected position of the location sensor 120-3, or the like. As seen in FIG. 7, the status information presented to the worker 164 indicates the path travelled to date, as well as which sensors remain to be inspected, and in this case, which sensors have passed or failed inspection. The sensor status information can alternatively be displayed to the worker 164 in list form.

Figure 8:
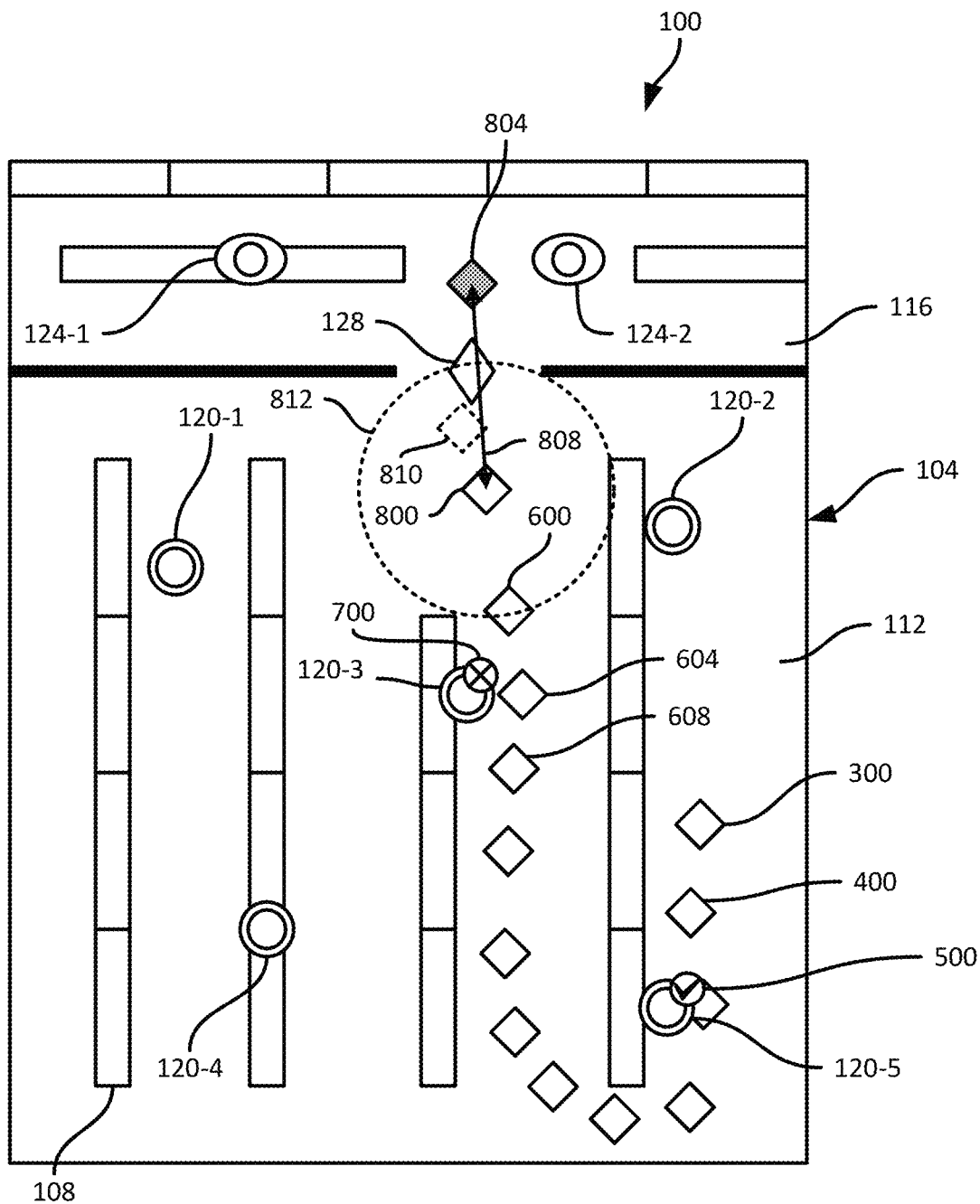
FIG. 8 is a diagram illustrating an example performance of blocks 210 and 250 of the method of FIG. 2.

Following block 220, the determination at block 225 is again affirmative, because not all sensors have been inspected. The computing device 132 therefore returns to block 205. FIG. 8 illustrates two further performances of the method 200, resulting in a location 800 which results in no further inspection indicators being assigned, and then a current location 804.

At block 210, the determination in this instance is negative, because the distance 808 between the current measured location 804 and the preceding measured location 800 exceeds the threshold. In other words, the current measured location 804 indicates an unlikely travel speed for the worker 164, and therefore indicates a likely problem with the operation of the system 100. Such a deviation may be caused by wiring a location sensor to a port on a switch connected to the computing device 132 that was intended for another sensor or by installing a location sensor in a wrong location and/or with an incorrect orientation. For example, the transitional location sensor 128 may be installed backwards, (for example, installed in an orientation that is rotated 180° about an axis orthogonal to the layout shown in FIG. 8 compared to the expected orientation as stored in the repository 176). As shown in FIG. 8, the actual location of the reference target 160 is a location 810, but the actual location 810 is incorrectly measured due to the incorrect orientation of the sensor 128.

Following a negative determination at block 210, the computing device 132 proceeds to block 250. At block 250, the computing device 132 is configured to select at least one location sensor, and assign the failed inspection indicator to the selected sensor(s). In particular, the computing device 132 is configured to select any location sensors within a predetermined radius of the most recent valid location, and mark those sensors as failed.

As shown in FIG. 8, the predetermined radius is indicated by a selection region 812, which encompasses the location sensor 128. The location sensor 128 is therefore assigned a failed inspection indicator. Updated status data is then presented, e.g. via the client device 168, at block 220. The path followed by the reference target 160 may be presented with the status data, but omits the invalidated location 804, and thus terminates at the previous location 800. In some examples, for subsequent performances of the method 200, the threshold applied at the following performance of block 210 may be adjusted to account for the additional time passed since the previous valid location was collected.

Figure 9:
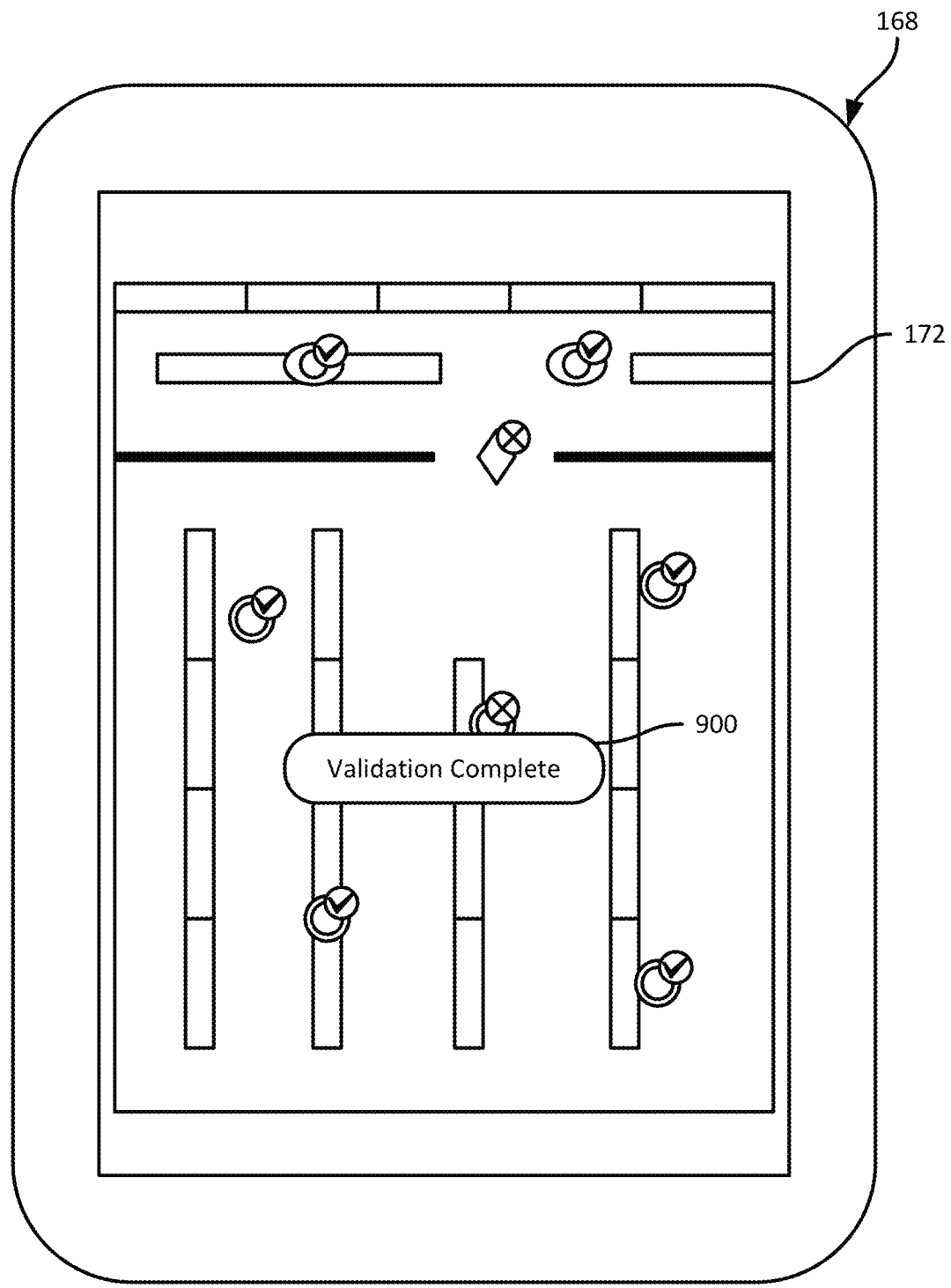
FIG. 9 is a diagram illustrating a completion message generated following block 225 of the method of FIG. 2.

Once all sensors have been inspected and assigned validated or failed inspection indicators, the determination at block 225 is negative, and performance of the method 200 ends. In some examples, the computing device 132 can send a message to the client device 168 for presentation via the display 172 to inform the worker 164 that the validation process is complete. An example of a completion message 900 is shown in FIG. 9, presented along with inspection indicators for each of the location sensors in the system 100.

As will be apparent, the status information mentioned above may also be presented by transmission to other computing devices, in addition to or instead of rendered at the client device 168.

As will be understood by those skilled in the art, certain technical advantages arise from the validation process set out above. For example, the time consumed by the validation process may be reduced relative to a process that relies on subsequent review of collected data by a subject matter expert. The incidence of inaccurate data collection for use in validation may also be reduced or eliminated by avoiding reliance on pre-planned travel paths for the reference target 160.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of validating a set of location sensors deployed in a facility, the method comprising:
   receiving sensor data from at least a subset of the location sensors;
   generating a current location of a mobile reference target within the facility based on (i) the sensor data and (ii) expected positions corresponding to the location sensors;
   based at least on the current location:
      (i) selecting at least one of the location sensors, and
      (ii) setting an inspection indicator for the selected location sensor;
   presenting sensor status data including the inspection indicator via an output device associated with the mobile reference target; and
   repeating the generating, the selecting, the setting, and the presenting until inspection indicators have been set for each of the location sensors,
   wherein selecting at least one of the location sensors includes:
   responsive to determining that a distance between the current location and a preceding location is greater than a threshold, selecting a subset of the sensors having expected locations within a predefined radius of the preceding location.

2. The method of claim 1, wherein the location sensors include RFID readers, and wherein the mobile reference target includes a set of RFID tags affixed to a mobile support.

3. The method of claim 1, wherein setting the inspection indicator includes setting a failed inspection indicator for each location sensor in the subset.

4. The method of claim 1, wherein selecting at least one of the location sensors further includes:
   maintaining inspection zones respective to each of the location sensors, each inspection zone defining an area of the facility corresponding to the respective location sensor;
   responsive to determining that a distance between the current location and a preceding location is smaller than a threshold, determining whether the current location is within any of the inspection zones; and
   when the current location is within one of the inspection zones, selecting the location sensor corresponding to the one of the inspection zones.

5. The method of claim 4, wherein setting the inspection indicator includes: when the sensor data used to determine the current location includes sensor data from the selected location sensor, setting a validated inspection indicator for the selection location sensor.

6. The method of claim 4, wherein setting the inspection indicator includes: when the sensor data used to determine the current location does not include sensor data from the selected location sensor, setting a failed inspection indicator for the selected location sensor.

7. The method of claim 6, further comprising:
   prior to setting the failed inspection indicator, determining that a threshold number of preceding locations of the mobile reference target were within the one of the inspection zones.

8. The method of claim 1, wherein presenting the sensor status data includes presenting (i) an indication, for each of the location sensors, of whether an inspection indicator has been set for the location sensor, and (ii) when an inspection indicator has been set for a given location sensor, the inspection indicator.

9. The method of claim 1, further comprising: responsive to determining that inspection indicators have been set for all of the location sensors, presenting a validation completion message.

10. A computing device, comprising:
    a communications interface connected to a set of location sensors deployed in a facility; and
    a processor configured to:
       receive sensor data from at least a subset of the location sensors;
       generate a current location of a mobile reference target within the facility based on (i) the sensor data and (ii) expected positions corresponding to the location sensors;
       based at least on the current location:
          (i) select at least one of the location sensors, and
          (ii) set an inspection indicator for the selected location sensor;
       present sensor status data including the inspection indicator via an output device associated with the mobile reference target; and
       repeat the generation, the selection, the setting, and the presentation until inspection indicators have been set for each of the location sensors,
       wherein the processor is configured, to select at least one of the location sensors, to:
       responsive to determining that a distance between the current location and a preceding location is greater than a threshold, select a subset of the sensors having expected locations within a predefined radius of the preceding location.

11. The computing device of claim 10, wherein the location sensors include RFID readers, and wherein the mobile reference target includes a set of RFID tags affixed to a mobile support.

12. The computing device of claim 10, wherein the processor is configured, to set the inspection indicator, to set a failed inspection indicator for each location sensor in the subset.

13. The computing device of claim 10, wherein the processor is further configured, to select at least one of the location sensors, to:
- maintain inspection zones respective to each of the location sensors, each inspection zone defining an area of the facility corresponding to the respective location sensor;
- responsive to determining that a distance between the current location and a preceding location is smaller than a threshold, determine whether the current location is within any of the inspection zones; and
- when the current location is within one of the inspection zones, select the location sensor corresponding to the one of the inspection zones.

14. The computing device of claim 13, wherein the processor is configured, to set the inspection indicator, to: when the sensor data used to determine the current location includes sensor data from the selected location sensor, set a validated inspection indicator for the selection location sensor.

15. The computing device of claim 13, wherein the processor is configured, to set the inspection indicator, to: when the sensor data used to determine the current location does not include sensor data from the selected location sensor, set a failed inspection indicator for the selected location sensor.

16. The computing device of claim 15, wherein the processor is further configured to:
- prior to setting the failed inspection indicator, determine that a threshold number of preceding locations of the mobile reference target were within the one of the inspection zones.

17. The computing device of claim 10, wherein the processor is configured, to present the sensor status data, to present (i) an indication, for each of the location sensors, of whether an inspection indicator has been set for the location sensor, and (ii) when an inspection indicator has been set for a given location sensor, the inspection indicator.

18. The computing device of claim 10, wherein the processor is further configured to: responsive to determining that inspection indicators have been set for all of the location sensors, present a validation completion message.

* * * * *